United States Patent
Helot

(10) Patent No.: US 9,688,148 B2
(45) Date of Patent: Jun. 27, 2017

(54) DEVICE FOR CONTROLLING DIFFERENT FUNCTIONS OF A MOTOR VEHICLE

(75) Inventor: Jacques Helot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 173 days.

(21) Appl. No.: 13/637,918

(22) PCT Filed: Mar. 19, 2011

(86) PCT No.: PCT/EP2011/001352
§ 371 (c)(1),
(2), (4) Date: Oct. 31, 2012

(87) PCT Pub. No.: WO2011/120640
PCT Pub. Date: Oct. 6, 2011

(65) Prior Publication Data
US 2013/0050124 A1 Feb. 28, 2013

(30) Foreign Application Priority Data
Mar. 27, 2010 (DE) .......................... 10 2010 013 170

(51) Int. Cl.
*G06F 3/033* (2013.01)
*B60K 37/06* (2006.01)
(Continued)

(52) U.S. Cl.
CPC ............ B60K 37/06 (2013.01); G06F 3/0486 (2013.01); G06F 3/0488 (2013.01);
(Continued)

(58) Field of Classification Search
CPC ............................ B60W 50/085; G06F 3/0412
(Continued)

(56) References Cited

U.S. PATENT DOCUMENTS 6,181,344 B1 * 1/2001 Tarpenning ........... G06F 1/1626
715/825
6,484,189 B1 * 11/2002 Gerlach et al. ............... 715/201
(Continued)

FOREIGN PATENT DOCUMENTS

DE    198 57 837    6/2000
DE    103 15 841    8/2004
(Continued)

OTHER PUBLICATIONS

International Search Report for PCT/EP2011/001352, mailed on Jun. 8, 2011.
(Continued)

*Primary Examiner* — Jose Soto Lopez
(74) *Attorney, Agent, or Firm* — Staas & Halsey LLP

(57) ABSTRACT

A device for controlling a plurality of different functions of a motor vehicle has an operator control element with which in each case one of the plurality of different functions can be actuated, and a touch-sensitive field which has a plurality of sections, each of which is at least temporarily assigned one of the different functions and which are provided with symbols corresponding to the respective function. A function can be selected by selecting one of the sections. In each case the function which was selected from the touch-sensitive field can be actuated the operator control element. A display device, in which the respectively selected function can be displayed a symbol, is provided on the operator control element or in the direct vicinity of the operator control element.

20 Claims, 2 Drawing Sheets

(51) Int. Cl.
*G06F 3/0486* (2013.01)
*G06F 3/0488* (2013.01)
*B60W 50/08* (2012.01)

(52) U.S. Cl.
CPC ............... *B60K 2350/1024* (2013.01); *B60K 2350/2004* (2013.01); *B60W 50/085* (2013.01)

(58) Field of Classification Search
USPC .................. 345/156, 173; 715/784; 340/438
See application file for complete search history.

(56) References Cited

U.S. PATENT DOCUMENTS

| | | | |
|---|---|---|---|
| 7,812,274 B2* | 10/2010 | Dupont | B60K 26/02 200/316 |
| 8,179,377 B2* | 5/2012 | Ciesla | G06F 3/0202 178/18.01 |
| 2002/0021282 A1* | 2/2002 | Masudaya | 345/156 |
| 2003/0006892 A1* | 1/2003 | Church | 340/439 |
| 2004/0056839 A1* | 3/2004 | Yoshihara | B60K 35/00 345/156 |
| 2004/0118664 A1* | 6/2004 | DePue et al. | 200/4 |
| 2005/0168435 A1* | 8/2005 | Reed et al. | 345/156 |
| 2006/0287792 A1* | 12/2006 | Jarrett | 701/50 |
| 2007/0277123 A1* | 11/2007 | Shin et al. | 715/863 |
| 2008/0211779 A1* | 9/2008 | Pryor | 345/173 |
| 2009/0122018 A1* | 5/2009 | Vymenets et al. | 345/173 |
| 2009/0213086 A1* | 8/2009 | Chae et al. | 345/173 |
| 2009/0228820 A1* | 9/2009 | Kim et al. | 715/769 |
| 2009/0309901 A1* | 12/2009 | Jho | 345/684 |
| 2010/0087230 A1* | 4/2010 | Peh | G06F 3/04817 455/566 |
| 2011/0181603 A1* | 7/2011 | Liang | G06F 3/03547 345/473 |

FOREIGN PATENT DOCUMENTS

| | | |
|---|---|---|
| DE | 10 2006 024 252 | 1/2008 |
| DE | 10 2007 018 956 | 12/2008 |
| DE | 10 2010 013 170.9 | 3/2010 |
| EP | 1 247 686 | 10/2002 |
| WO | PCT/EP2011/001352 | 3/2011 |

OTHER PUBLICATIONS

International Preliminary Report on Patentability for PCT/EP2011/001352, mailed on Oct. 11, 2012, 6 pages.
German Examination Report dated Sep. 29, 2015 from German Patent Application No. 10 2010 013 170.9, 5 pages.

* cited by examiner

DEVICE FOR CONTROLLING DIFFERENT FUNCTIONS OF A MOTOR VEHICLE

CROSS REFERENCE TO RELATED APPLICATIONS

This application is based on and hereby claims priority to International Application No. PCT/EP2011/001352 filed on Mar. 19, 2011 and German Application No. 10 2010 013 170.9 filed on Mar. 27, 2010, the contents of which are hereby incorporated by reference.

BACKGROUND

The invention relates to a device for controlling a plurality of different functions of a motor vehicle.

A device of the generic type is known from U.S. 2008/0211779 A1.

EP 1 247 686 B1 describes a method and a device for selecting vehicle functions in a motor vehicle. In this context, certain pushbutton keys can be selected by a screen, and where necessary removed by a user or moved by drag-and-drop.

DE 10 2006 024 252 A1 describes a control system for a vehicle cockpit in which, inter alia, playback window concepts can be moved between individual displays in a drag-and-drop function.

SUMMARY

One potential object is to provide a device for controlling a plurality of different functions of a motor vehicle, which device has the smallest possible number of switches and at the same time can be controlled as intuitively as possible.

The inventor proposes a device for controlling a plurality of different functions of a motor vehicle. The device has an operator control element with which in each case one of the plurality of different functions can be actuated, and a touch-sensitive field which has a plurality of sections, each of which is at least temporarily assigned one of the different functions and which are provided with symbols corresponding to the respective function. A function can be selected by selecting one of the sections. In each case the function which was selected from the touch-sensitive field can be actuated by the operator control element. A display device, in which the respectively selected function is displayed by a symbol, is provided on the operator control element or in the direct vicinity of the operator control element.

The proposed device permits a considerable reduction in the number of operator control elements or pushbutton keys for actuating the same number of functions as before, by virtue of the concept of a central operator control element with which, depending on the selection made by the operator using the sections of the touch-sensitive field, the desired function of the different functions can be actuated. A particular advantage of the solution is that the user can use one and the same operator control element to control different functions, as a result of which an intuitive and therefore a particularly simple operator control of the device is obtained. This intuitive operator control is assisted by virtue of the fact that a display device is provided on the operator control element or in the direct vicinity of the operator control element The use of a touch-sensitive field in which the different functions are stored in respective sections permits software programming of the control device, with the result that, on the one hand, different functions can be stored in the sections and, on the other hand, the device can be used for a wide variety of motor vehicles, in which case completely different functions advantageously can be controlled only by software changes with an operator control device which is basically identical in terms of the hardware.

According to the inventor's proposal, there is provision that the function which can be actuated by the operator control element can be selected by sliding the symbol represented on the selected section in the direction of the operator control element. This solution provides the user with completely new operator control possibilities, a particular advantage being the fact that in this way incorrect operator control operations can be prevented.

In order to provide greater comfort for an operator who is using the device, it is possible, in one advantageous refinement, to provide that the operator control element is embodied in such a way that it provides a user with haptic feedback.

An example of such an operator control element is a control knob or a rocker switch.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
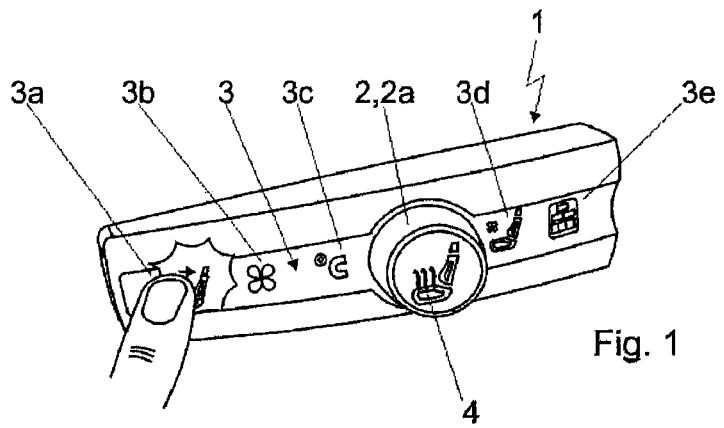
FIG. 1 shows a first embodiment of the device according to one embodiment of the inventor's proposal, in a first operating state.

Reference will now be made in detail to the preferred embodiments of the present invention, examples of which are illustrated in the accompanying drawings, wherein like reference numerals refer to like elements throughout.

FIG. 1 shows a first embodiment of a device 1 for performing operator control of a plurality of different functions of a motor vehicle (not illustrated) in which the device 1 is arranged. The device 1 is preferably arranged in the region of a central console (not illustrated).

Figure 2:
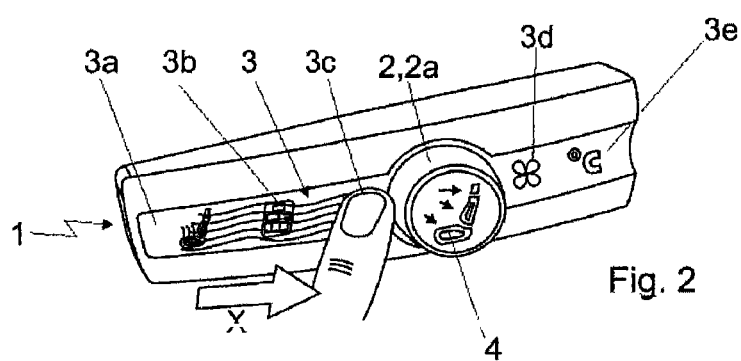
FIG. 2 shows the device from FIG. 1 in a second operating state.
Figure 3:
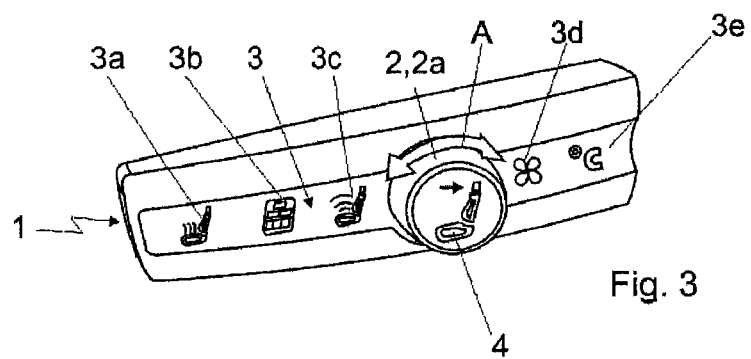
FIG. 3 shows the device from FIG. 1 in a third operating state.
Figure 4:
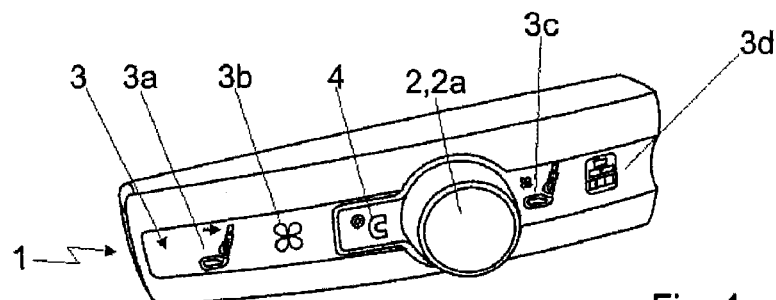
FIG. 4 shows a second embodiment of the device according to the inventor's proposal.

The device has a central operator control element 2 which is configured in each case in the embodiment in FIGS. 1-3 and the embodiment in FIG. 4 as a control knob 2a which provides haptic feedback. On each side, a touch-sensitive field 3, which can also be referred to as a touch pad, extends away from the operator control element 2. The touch-sensitive field 3 has a plurality of sections, in the present case a total of five sections, which are denoted by the reference symbols 3a, 3b, 3c, 3d and 3e. The sections 3a-3e are each assigned a different function, and the sections 3a-3e are provided with respective symbols which indicate to an operator of the device 1 which function is currently stored in the respective section 3a-3e. The respective function is selected by selecting one of the sections 3a-3e. This function can subsequently be actuated with the operator control element 2.

In principle it is possible to provide that the function which can be actuated by the operator control element 2 can be selected by pressing or double clicking on the respective section 3a-3d of the touch-sensitive field 3, in the embodiments illustrated in the figures the function which can be actuated by the operator control element 2 is selected however in such a way that the symbol which is represented on the selected section 3a-3e is slid in the direction of the operator control element 2.

In addition, in the embodiment in FIGS. 1-3 a display device 4 is provided on the operator control element 2, in which display device the respectively selected function is displayed. In the embodiment according to FIGS. 1-3, the display device 4 is therefore embodied as a display which is provided on the operator control element 2. In the operating state of the device 1 which is illustrated in FIG. 1, the symbol for a seat heater can be seen on the display device 4 of the operator control element 2. In this operating state, the user can therefore control the operation of the seat heater by activating the operator control element 2. However, in the present case, the user selects a ventilation direction by touching the section 3a and sliding the symbol displayed therein, the symbol indicating this ventilation direction, in the direction of the operator control element 2, and the symbol for the ventilation direction is therefore located next to the operator control element 2 and is furthermore displayed in the display device 4 of the operator control element 2. The sliding of the symbol occurs according to arrow "X" in FIG. 2. Subsequently, as indicated by the arrow "A" in FIG. 3, the control knob 2a can be turned in order to select a specific setting of the ventilation. As is apparent from FIGS. 2 and 3, as a result of the sliding of the symbol shown on the section 3a in the direction of the operator control element 2 the other symbols on the sections 3b-3e are also slid. As a result, the sections 3a-3e are only temporarily assigned the different functions. In this context it is necessary to note that although the symbols on the individual sections can change, the sections themselves remain on one and the same side. In principle it would also be possible to change the sequence of the symbols 3a-3e by correspondingly touching and sliding the sequence.

If the operator control element 2 which is embodied as a control knob 2a has the display device 4, preferably just one ring is movably mounted on the outer circumference of the operator control element 2, and the symbol which is displayed on the display device 4 therefore always remains oriented in a vertical position.

In the present case, the functions stored in the sections 3a-3d of the touch-sensitive field 3 are functions of an air-conditioning system, but in principle the device 1 could also be used to operate other functions, for example the functions of a radio system or general vehicle functions such as, for example, the functions of an, if appropriate automatic, parking system, of a rear roller blind or side roller blind, of a soft top, of a lane assistance system, of a parking aid system, of a sport setting or comfort setting system etc.

A device which is very similar to the device illustrated in FIG. 1 is illustrated in FIG. 4. Here, only four sections 3a, 3b, 3c and 3d can be seen, but in principle the touch-sensitive field 3 in all the embodiments described herein can have virtually any desired number of sections which can be activated. In contrast to the embodiment in FIGS. 1-3, in the embodiment according to FIG. 4 the display device 4 is not provided on the operator control element 2, but rather next to it. In the illustrated operating situation, it is possible to set the temperature in the passenger compartment of the motor vehicle by the operator control element 2 which is likewise embodied as a control knob 2a. The embodiment of the device 1 which is illustrated in FIG. 4 is simpler in that the display device 4 can be integrated in the touch-sensitive field 3 in which a plurality of symbols are already present on the respective sections 3a-3d, and this embodiment can therefore be constructed more cost-effectively.

Figure 5:
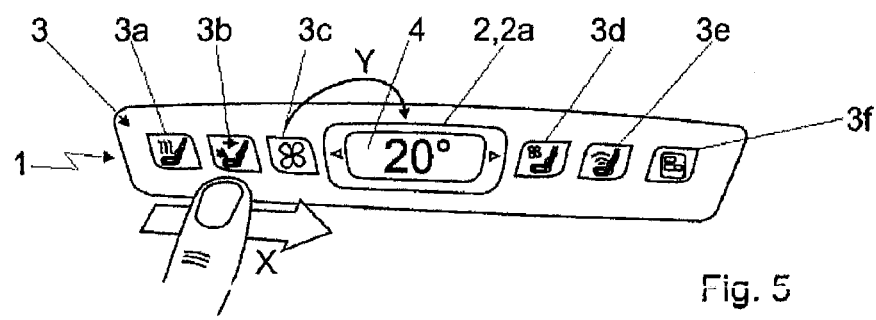
FIG. 5 shows a third embodiment of the device according to the inventor's proposal in a first operating state.
Figure 6:
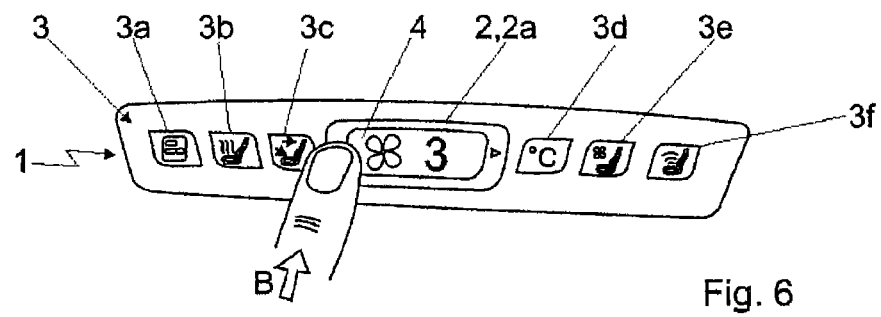
FIG. 6 shows the device from FIG. 5 in a second operating state.

A further alternative embodiment of the device 1 is illustrated in FIGS. 5 and 6. In this context, the operator control element 2 is embodied as a rocker switch 2b. The rocker switch 2b provides, like the control knob 2a, haptic feedback for the user. Similarly to the embodiment described above, the touch-sensitive field 3 is provided once more, and in this case it has six sections 3a, 3b, 3c, 3d, 3e and 3f. Again, by sliding one of the symbols, in the present case the fan symbol on the section 3c in the direction of the operator control element 2, this function is transferred into the operator control element 2 and can, as illustrated in FIG. 6, be correspondingly controlled. The actuation of the rocker switch 2 occurs here by pressing according to the arrow "B" in FIG. 6. The arrow "Y" represents how the fan symbol in the display device 4, provided on or in the operator control element 2 in this case, is transferred.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A device to control a plurality of different functions of a motor vehicle, comprising:
   an operator control element configured to actuate and adjust a first function from among the plurality of different functions;
   a display device provided on the operator control element or in a direct vicinity of the operator control element; and
   a touch-sensitive field configured to have a plurality of sections arranged adjacent to one another and aligned in a single straight-line fashion along a first direction, each of which is at least temporarily assigned one of the plurality of different functions, each section being provided with a selector symbol corresponding to a respective assigned function,
   wherein a selection of a selected function from among the plurality of different functions in the touch-sensitive field consists of selecting one of the sections and subsequently performing a touch-sensitive sliding of the selector symbol corresponding to the selected function, in the single straight-line fashion along the first direction, toward the operator control element, to thereby transfer the selected function into the operator control element,
   wherein by transferring the selected function into the operator control element, the operator control element is changed from being configured to adjust the first function to being configured to adjust the selected function by a subsequent adjustment of the operator control element,
   wherein the selected function is displayed on the display device using an actuator symbol, wherein the operator control element is arranged adjacent to at least one of the plurality of sections and is aligned in the single straight-line fashion along the first direction with the plurality of sections, wherein the operator control element and touch-sensitive field are installed in a console of the motor vehicle, and wherein the operator control element is embodied as one of a control knob or a rocker switch.

2. The device according to claim 1, wherein
the operator control element is embodied to provide a user with haptic feedback.

3. The device according to claim 1, wherein
for the selected function, a single symbol is used for both the selector symbol and the actuator symbol.

4. The device according to claim 2, wherein
the operator control element is a control knob.

5. The device according to claim 2, wherein
the operator control element is a control knob that is rotated to actuate the selected function, and
the display device is a display provided in a center of the control knob.

6. The device according to claim 1, wherein
the operator control element is a control knob that is rotated to actuate the selected function, and
the display device is a display provided in a center of the control knob.

7. The device according to claim 2, wherein
the operator control element is a rocker switch.

8. The device according to claim 7, wherein
the display device is a display which is provided in a center of the rocker switch.

9. The device according to claim 1, wherein
the operator control element is a rocker switch, and
the display device is a display which is provided in a center of the rocker switch.

10. The device according to claim 1, wherein
the display device is a display which is provided on the operator control element.

11. The device according to claim 1, wherein
the sections of the touch-sensitive field are assigned functions of an air-conditioning system.

12. The device according to claim 1, wherein
the sections of the touch-sensitive field are assigned functions of a radio system.

13. The device according to claim 1, wherein
the sections of the touch-sensitive field are assigned functions of a navigation device.

14. The device according to claim 1, wherein, when the selected function is selected, at least one section among the plurality of sections is assigned a different function.

15. The device according to claim 1, wherein, when the selected function is selected, at least one selector symbol displayed in a section among the plurality of sections changes to a different selector symbol.

16. The device according to claim 1, wherein, as a result of the touch-sensitive sliding of the selector symbol corresponding to the selected function, in the single straight-line fashion along the first direction, toward the operator control element, at least one other selector symbol also slides.

17. The device according to claim 1, wherein a first section among the plurality of sections is temporarily assigned to the selected function before the touch-sensitive sliding of the selector symbol corresponding to the selected function, wherein, when the selected function is selected, the selected function is displayed on the display device using an actuator symbol and replaces a previously selected function displayed on the display device, wherein, in response to the sliding of the selector symbol corresponding to the selected function, one of the first section or a second section among the plurality of sections is assigned the previously selected function which was displayed on the displayed device.

18. The device according to claim 17, wherein, the first section is provided with a selector symbol corresponding to the previously selected function when the first section is assigned the previously selected function, and
the second section is disposed adjacent to the operator control element in a same direction of the sliding of the selector symbol, and is provided with a selector symbol corresponding to the previously selected function when the second section is assigned the previously selected function.

19. The device according to claim 1, wherein
the touch-sensitive field is separately provided from the operator control element such that sensing of the sliding of the selector symbol does not occur at the operator control element.

20. The device according to claim 1, wherein
the sections of the touch-sensitive field are assigned functions of an air-conditioning system,
a first section is temporarily assigned a second function corresponding to a first one of setting a temperature, selecting a ventilation direction, and controlling an operation of a seat heater,
a second section is temporarily assigned a third function corresponding to a second one of setting the temperature, selecting the ventilation direction, and controlling the operation of the seat heater, and
the operator control element is configured to actuate and adjust the selected function corresponding to a third one of setting the temperature, selecting the ventilation direction, and controlling the operation of the seat heater.

* * * * *